United States Patent [19]

Hopely, Jr.

[11] Patent Number: 5,240,086
[45] Date of Patent: Aug. 31, 1993

[54] REMOVABLE DRIVE TRAIN FROM FRAME OF A PERSONAL VEHICLE

[75] Inventor: Robert C. Hopely, Jr., Gibbstown, N.J.

[73] Assignee: Electric Mobility Corp., Sewell, N.J.

[21] Appl. No.: 880,684

[22] Filed: May 8, 1992

[51] Int. Cl.⁵ .................... B62D 21/12; B62K 11/14
[52] U.S. Cl. .................................... 180/208; 280/720
[58] Field of Search .............. 180/208, 215, 216, 907; 280/DIG. 5, 720

[56] References Cited

U.S. PATENT DOCUMENTS

| | | | |
|---|---|---|---|
| 3,860,259 | 1/1975 | Allison et al. | 280/720 |
| 4,909,525 | 3/1990 | Flowers | 180/216 |
| 4,947,955 | 8/1990 | Hopely, Jr. | 180/208 |
| 5,074,372 | 12/1991 | Schepis | 180/208 |
| 5,154,251 | 10/1992 | Fought | 180/208 |

Primary Examiner—Karin Tyson
Attorney, Agent, or Firm—Edmund M. Jaskiewicz

[57] ABSTRACT

A personal mobility vehicle comprises front and rear frame sections which can be readily disassembled and assembled and further comprises a drive train unit which can be disassembled and assembled from the rear frame section.

7 Claims, 5 Drawing Sheets

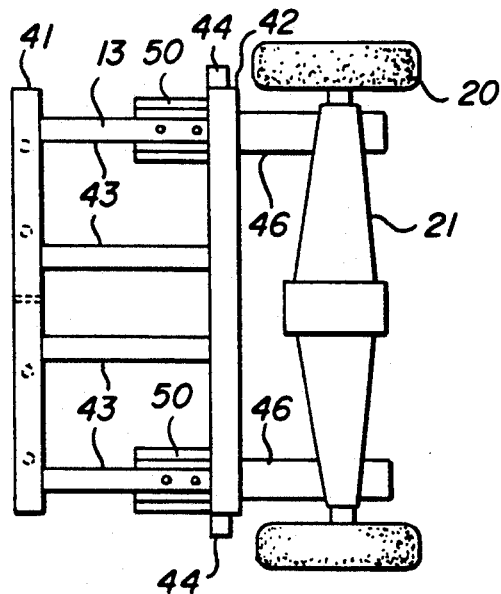
FIG. 3
FIG. 4
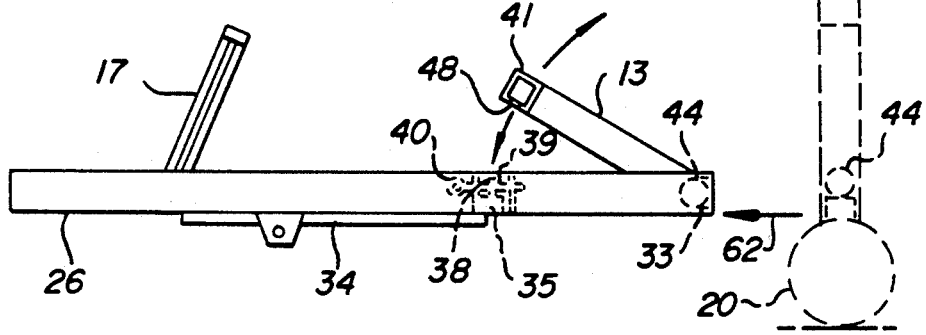
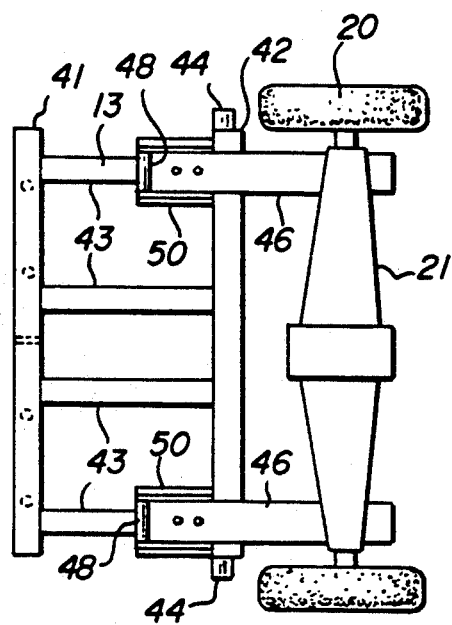
FIG. 5

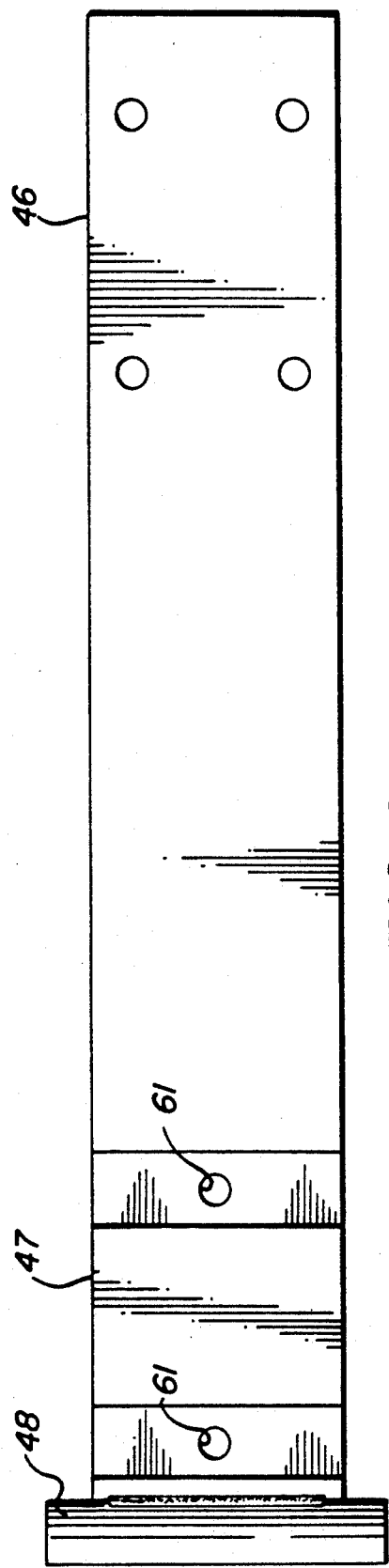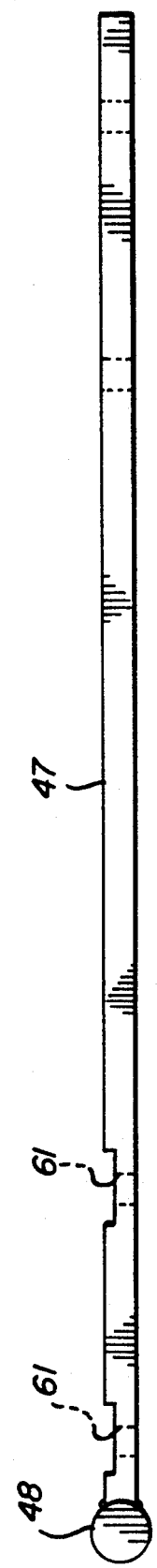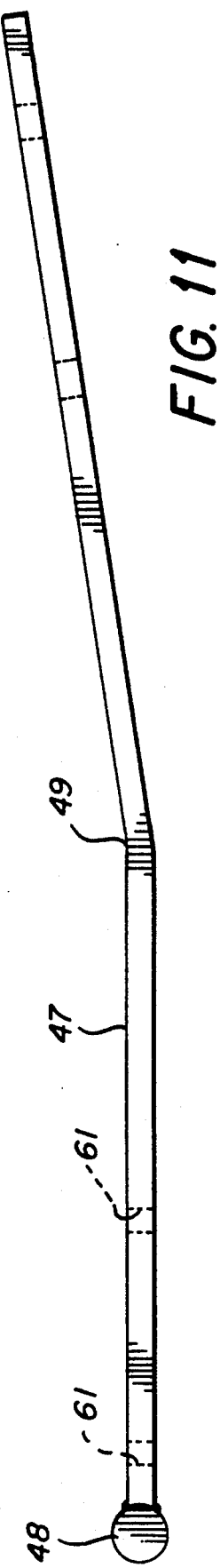

REMOVABLE DRIVE TRAIN FROM FRAME OF A PERSONAL VEHICLE

FIELD OF THE INVENTION

The present invention relates to a self-propelled personal vehicle generally intended for persons who have some physical disability, more particularly, to such a vehicle having a drive train assembly which is readily detachable from the frame of the vehicle.

A large variety of small personal mobility vehicles have been developed in order to provide persons with partial or total walking disabilities with an increased range and greater flexibility in locomotion. Such vehicles generally comprise a pair of rear wheels which are powered by an electric storage battery, a single front wheel or a pair of front wheels which are steerable and a seat unit which is positioned at different locations with respect to the front and rear wheels. These components are generally mounted on some form of a frame or platform. When such a personal mobility vehicle is assembled and ready for operation, the vehicle is generally too heavy in weight and bulky in configuration to be handled by a single person such as when loading the vehicle into an automobile for transport or transferring the vehicle up a flight of stairs. It is generally necessary to provide an attendant to render additional assistance in loading the vehicle into a van or the like or a powered lift platform must be provided to lift and lower the vehicle.

DESCRIPTION OF RELATED ART

It has therefore been proposed to construct such vehicles so that they may be disassembled into several components to facilitate the transfer of such vehicles in some manner to another site at which it is desired to operate the personal mobility vehicle. In U.S. Pat. Nos. 4,909,525 and 4,947,955 such personal mobility vehicles are disclosed which may be readily disassembled into a separate power unit and control unit. Further, the connecting structure for these units is such that the units or components may be readily assembled at another location. However, it has been discovered that the separated power unit still presents a problem when handled by an individual person because of its weight and bulk. Such a power unit usually includes a source of energy, such as an electric storage battery, a transaxle which is operatively connected to the storage battery and a pair of driving wheels mounted on the ends of the transaxle. Because of their inherent construction and function, the assembly of these components particularly presents difficulties because of its weight when being handled by an individual person.

It has therefore been proposed in U.S. Pat. No. 4,570,739 to construct a personal mobility vehicle wherein the drive unit consisting of differentially connected rear wheels and electric motor and belts and pulleys drivably connected the motor to a differential unit are all mounted on a frame which in turn is detachable from the main framework of the vehicle. However, this vehicle is similar to other separable prior art vehicles in that a rear or drive unit is detachable from a front or control unit.

It has also been proposed to provide other forms of motor vehicles which have detachable or removable drive units. Such vehicles are disclosed in U.S. Pat. Nos. 4,027,737; 3,842,927 and 3,656,571. In each of these prior art patents, a drive unit is mounted on a rear frame section which in turn is detachable from a front frame section or the main framework of the vehicle.

SUMMARY OF THE INVENTION

It is therefore the principal object of the present invention to provide a novel and improved personal mobility vehicle in which the power frame unit can be removed from the frame of the vehicle.

It is another object of the present invention to provide a personal mobility vehicle which can be separated into a control unit, and a drive unit and in which the drive unit can be further separated into a rear frame section and a drive train assembly.

It is a further object of the present invention to provide a novel and improved structure for detachably connecting a drive train assembly to a frame member of a motor vehicle It is an additional object of the present invention to provide personal mobility vehicle which can be quickly and easily separated into a plurality of light weight and easily handled components including a separate drive train assembly.

According to one aspect of the present invention in a personal vehicle there is provided a frame and a drive train assembly comprising a transaxle and drive wheels on the ends thereof is positionable rearwardly of the rear end of the frame in an operative position. The drive train assembly has extension means projecting forwardly therefrom and the forward end of the extension means is detachably connected to the frame forwardly of the rear end of the frame. Means are further provided which are engageable with the extension means for locking the extension means onto the frame after detachable connection of the extension means front end to the frame in such a manner that the extension means are locked against pivotal or longitudinal movement.

The extension means on the drive train assembly further comprises a pair of parallel arms which are leaf springs and the forward end of these leaf springs are provided with pins which are detachably received within grooves disposed in mounting blocks attached to the underside of the frame.

BRIEF DESCRIPTION OF THE DRAWINGS

Other objects and advantages or the present invention will be apparent upon reference to the accompanying description when taken in conjunction with the following drawings, which are exemplary, wherein;

FIG. 3 is a top plan view of the rear frame section of the vehicle in FIG. 1 with the drive train assembly attached in operative position;

FIG. 4 is a side elevational view showing the front and rear frame sections of FIGS. 2 and 3 assembled and the rear frame section in position to be pivoted into locking position in the front frame section;

FIG. 5 is a view similar to FIG. 3 but showing a bottom plan view of the rear frame section of the vehicle with the drive train assembly connected in operative position;

FIG. 9 is a top plan view in enlarged scale of the spring leaf extension arm of the drive train assembly;

FIGS. 10 and 11 are side elevational views of two embodiments of the leaf spring invention arm of FIG. 9;

DESCRIPTION OF THE PREFERRED EMBODIMENT

Proceeding next to the drawings wherein like reference symbols indicate the same parts throughout the various views a specific embodiment and modifications of the present invention will be described in detail.

Figure 1:
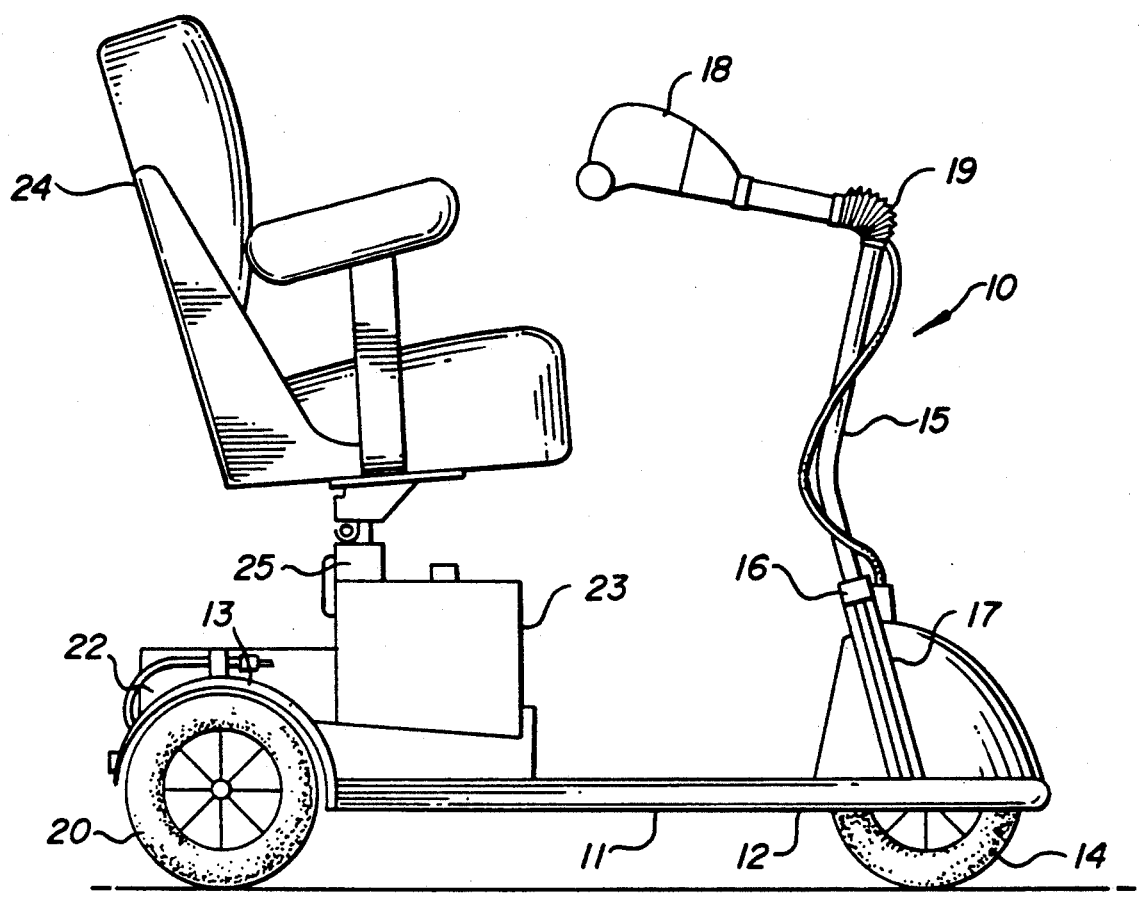
FIG. 1 is a side elevation view of a three wheel personal mobility vehicle which incorporates the present invention.
Figure 2:
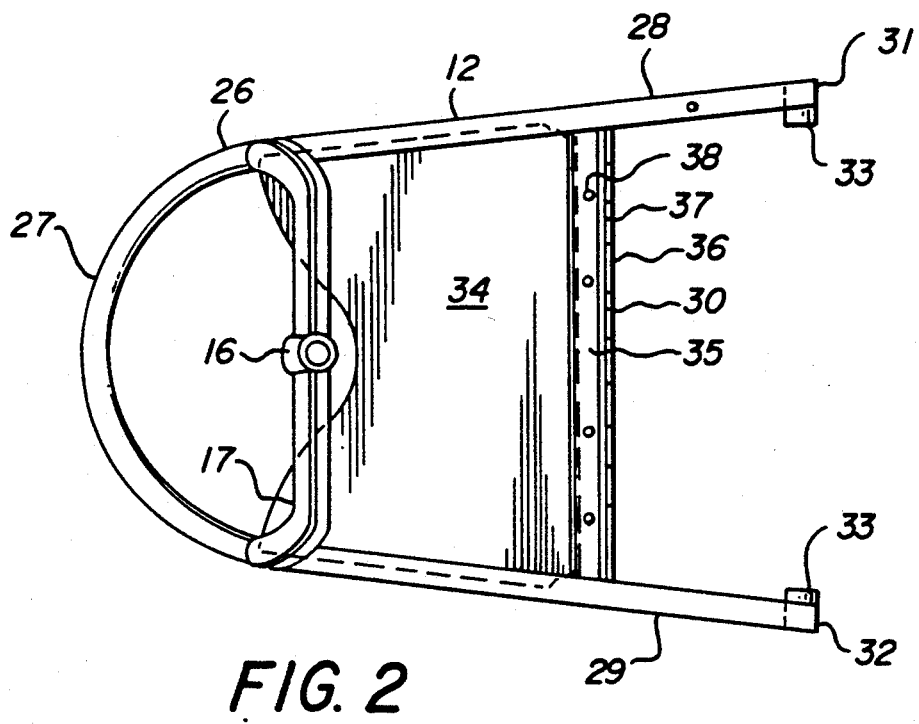
FIG. 2 is a top plan view of the front frame section of the vehicle of FIG. 1.

As may be seen in FIG. 1, a personal mobility vehicle incorporating the present invention is indicated generally at 10 and comprises a light weight aluminum frame 11 which consists of a front frame section 12 and a rear frame section 13 illustrated in greater detail in FIGS. 2 and 3 respectively. The front frame section 12 comprises a front wheel 14 which is steerable by means of a handle bar 15 which is pivotally mounted in a head tube 16 mounted on a head tube support 17. The upper end of the handle bar 15 has a control unit 18 which may comprise a volt meter/fuel gauge, on-off key switch and a dial-speed adjustment knob. The handle bar 15 also has an adjustable joint 19 which enables the control unit 18 to be adjusted to any desired height.

The rear frame section 13, shown in FIG. 3 comprises drive wheels 20 mounted on the ends of a sealed direct drive transaxle 21 which is drivingly connected to an electric motor 22 powered by batteries 23. A pivotable seat unit 24 is mounted on a socket 25 which is upstanding from the rear frame section 13. Preferably, the rear frame section also includes a built-in battery charge which is not illustrated.

The personal mobility vehicle can be readily disassembled into the front frame section 12 and the rear frame section 13 as shown in FIGS. 2 and 3. The front frame section 12 comprises a U-shaped frame loop 26 with the closed end of the frame loop defining the front 27 and the frame loop having a pair of slightly diverging longitudinal members 28 and 29. A cross member 30 connects the longitudinal members 28 and 29 inwardly of the ends thereof to define a rear portion of the front frame section. The longitudinal members 28 and 29 having ends 31 and 32 respectively and secured on the ends are transversely extending pivot cups 33 which are substantially U-shaped and which open longitudinally and toward the rear of the front frame section 12. The central portion of the front frame section extending approximately between the cross member 30 and the head tube support 17 is covered by a floor pan 34 attached to the underside of the frame loop.

The cross member 30 comprises a channel member which opens upwardly and has a web 35 and a flange 36 facing toward the rear of the front frame section. The flange 36 has a plurality of spaced rectangular notches 37 therein to accommodate respectively the center support members on the rear frame section 13 in a manner to be presently described.

The web 35 of the cross member 30 has on its inner surface a plurality of upwardly extending cylindrical protuberances 38. There is a pair of opposed openings in the central portion of the flange to accommodate a locking pin 39 having a pull loop 40. The locking pin 39 is preferably of the type which has a spring biased depressable detent so as to prevent the pin from disengaging itself from the openings.

The rear frame section 13 shown in FIG. 3 comprises front and rear cross members 41 and 42 which are interconnected by a plurality of center support members 43. These members are all preferably formed of square section aluminum tubing. A pair of oppositely disposed pivot pins 44 extend transversely from the ends of the rear cross member 42. These pivot pins are cylindrical and shaped to fit pivotably into the pivot cups 33.

Figure 6:
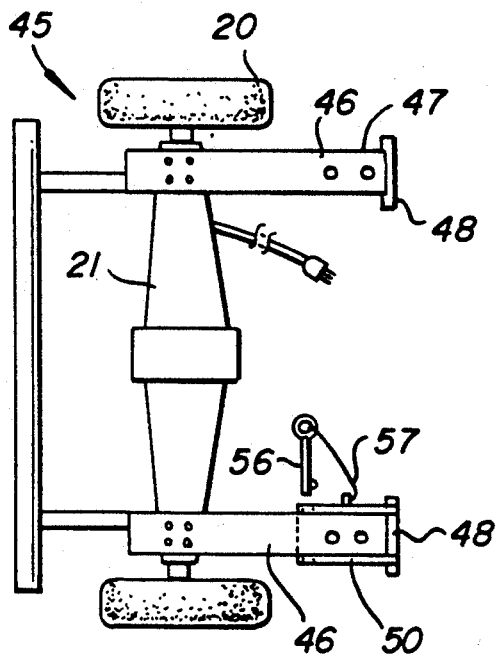
FIG. 6 is a bottom plan view of the drive train assembly shown in FIG. 5 but detached from the rear frame section.

In FIG. 6, there is illustrated generally at 45 a drive train assembly which comprises the power axle 21 and the rear wheels 20 which are mounted in an operative position rearwardly of the rear cross member 42 of the rear frame section 13. Extending forwardly from the transaxle 21 is a pair of flat leaf springs 46 having front ends 47 which are detachably connected to the undersides of the outer central cross members 43 of the rear frame section 13 as shown in FIG. 3. A cylindrical pin 48 is welded to the front edge of the forward portion 47 of the leaf spring 46 and the length of the pin 48 is greater than the width of the leaf spring 46 so that the ends of the pin 48 project laterally from the sides of the leaf spring. When viewed from the side, the leaf spring 46 is straight as seen in FIG. 10 but may have its rear end bent upwardly at 49 as shown in FIG. 11 so as to be able to accommodate larger diameter rear wheels.

Figure 7:
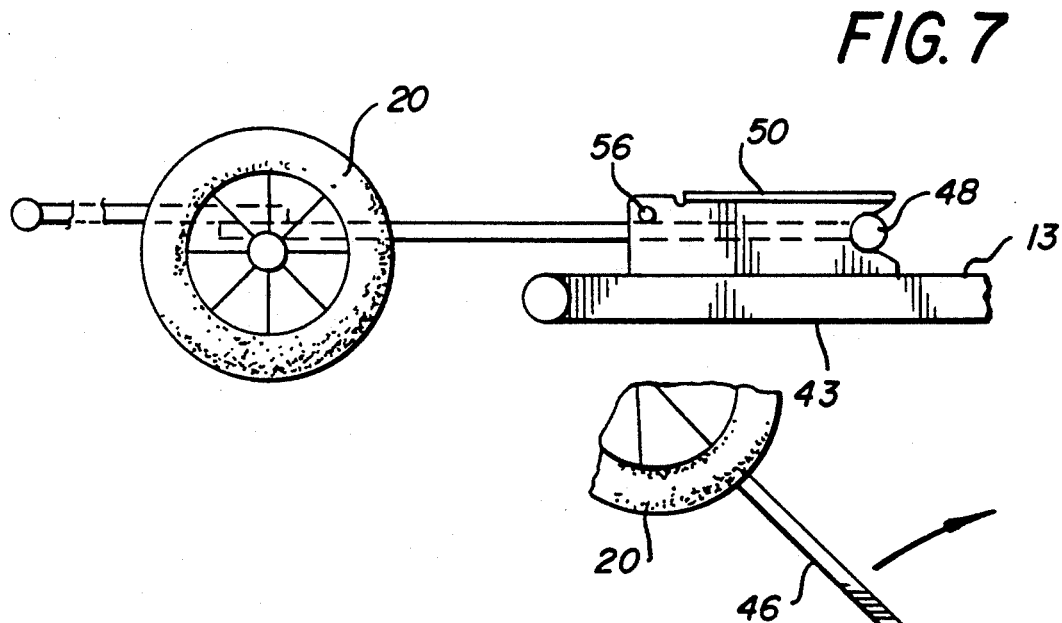
FIG. 7 is a side elevational view showing the drive train assembly detachably connected to the mount on the underside of the rear frame section.

The forward portion 47 of each leaf spring is received and seated within a channel shaped mount 50 attached to the underside of the rear frame section 13 as shown in FIG. 7. In FIG. 7, the frame is shown in the upside down position.

The mount 50 has a web 51 and upstanding from the longitudinal edges of the web are flanges 52 whose outer ends are bent outwardly at 53 to form sides for receiving the forward end 47 of the leaf spring. The forward ends of both flanges 52 are provided with substantially U-shaped notches or grooves 54 opposed from each other so as to receive the projecting ends of the cylindrical pin 48. Opposed openings 55 are formed near the rear ends of the flanges 52 to receive a quick release pin 56 attached to the mount by a lanyard 57. A pair of blocks 58 are welded to the upper surface of the web 51 and are provided with openings 59. Each mount 50 is attached to the rear frame section by bolts 60 passing upwardly through outer central members 43 and the ends of the bolts then pass through the openings 61 in the leaf spring and are then bolted in position. The bolts 60 that hold the drive train mount 50 in position also lock the leaf springs 47 from moving forwardly and rearwardly in longitudinal movement. The upper surface of the leaf spring 47 may be provided with a pair of transverse recesses or notches 62 each including an opening 61. The recesses 62 receive the projecting blocks 58 within a mount 50 and assist in restraining the leaf spring 47 from movement forwardly and rearwardly.

Figure 8:
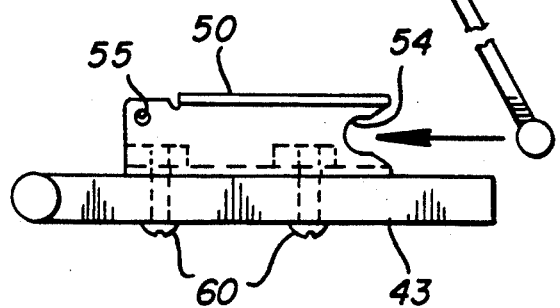
FIG. 8 is the side elevational view similar to that of FIG. 7 but showing the drive train unit in position just prior to being connected to the mount.
Figure 12:
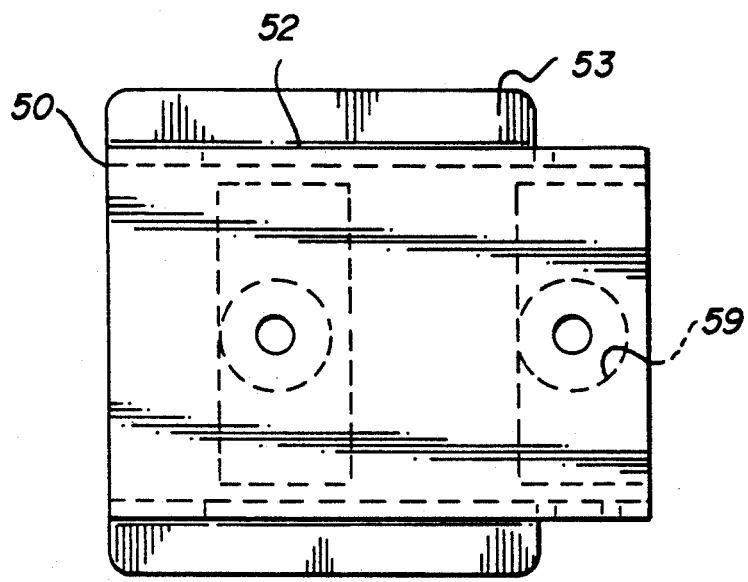
FIG. 12 is the bottom plan view of the mount block shown in FIGS. 7 and 8.
Figure 14:
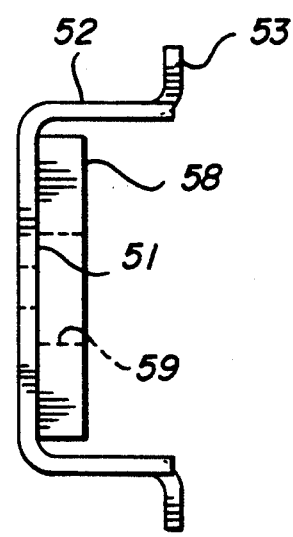
FIG. 14 is an end elevational view of the mount of FIG. 12.
Figure 13:
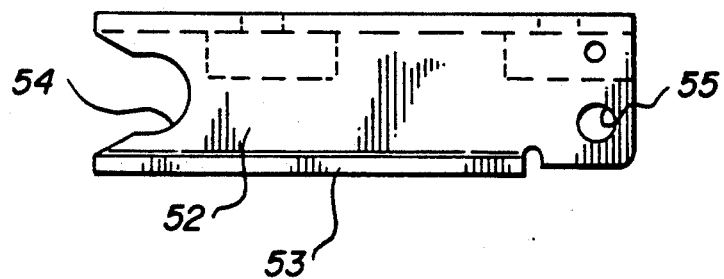
FIG. 13 is the side elevational view of the mount block of FIG. 12.

The assembled vehicle, as shown in FIG. 1 can be readily disassembled into three components in a matter of seconds without tools. The rear frame section 13 is disassembled from within the front frame section by withdrawing the locking pin 39 and then pivoting the rear frame section in a clock wise direction as shown in FIG. 4 until the rear frame section is in a vertical upright position as indicated on the right hand side of FIG. 4. Subsequently, the front frame section is then moved longitudinally in the direction of the arrow 62 to disassemble the front and rear frame sections. Next, the rear frame section with the drive train assembly still attached is rotated into an upside down position as shown in FIG. 7, the quick release pin 56 is withdrawn and the bolts 60 are disconnected. The drive train assembly is then pivoted in the clock wise direction as indicated in FIG. 8 so that the pin 48 becomes disengaged from the mounting block grooves 54. The disassembly of the drive train unit 45 from the rear frame section 13 thus facilitates handling both of these units. The rear frame section 13 is then quite light in weight and the drive train assembly 45 is lighter in weight and less cumbersome to handle because of the absence of the rear frame section.

The removable feature of the drive train unit also facilitates making any necessary repairs to the drive train unit or replacement of the drive train unit.

The above described connections between the front and rear frame sections and between the drive train assembly and the rear frame section provide a secure and rigid assembled frame which will withstand significant shocks and impacts, such as may occur such as when the vehicle is driven off a curb.

The detachable drive train according to the present invention is not limited to use on a detachable two-piece aluminum frame such as disclosed herein but can also be used on various other forms of frames or frame structures for different kinds of vehicles. Such other forms of frames or frame structures may be formed of different materials and include a one-piece frame made of steel. One embodiment of such a one-piece frame is used for a personal vehicle and is similar in shape to the assembled two-piece frame disclosed herein but is made in a single unit, is smaller in size and does not have detachable front and rear frame sections. Further, the disclosed detachable drive train may be used on much larger vehicle frames such as would be used for trucks and buses.

Thus it can be seen that the present invention provides an improved personal mobility vehicle wherein the detachability of the drive train unit from the rear frame section and detachability of the rear frame section from the front frame section provides three light weight components which can be easily handled by a single individual. The described detachable connections enable the vehicle to be readily disassembled and assembled in a matter of seconds without the use of any tools and may be actually carried out by the user without any assistance since the individual components are relatively light weight and are shaped to be easily handled. Further, the disassembly of the vehicle into several components significantly facilitates transportation of the personal mobility vehicle by any desired mode of transportation.

The assembly of a modified vehicle into a one-piece frame and a drive train unit also significantly facilitates transporting and handling of such a modified personal vehicle.

It will be understood that this invention is susceptible to modification in order to adapt it to different usages and conditions, and accordingly, it is desired to comprehend such modifications within this invention as may fall within the scope of the appended claims.

What is claimed is:

1. In a personal vehicle, a frame having a rear end, a drive train assembly comprising a transaxle and drive wheels on the ends thereof and positionable rearwardly of said frame rear end to define an operative position, extension means projecting forwardly from said drive train frame assembly and having a front end, means on the underside of said frame forwardly of said rear end thereof for detachably connecting the front end of said extension means to said frame, said detachable connecting means comprising a pair of mounts each attached to the underside of said frame, said mounts each comprising a channel-shaped member having a web attached to said frame and a pair of flanges attached to said web, there being grooves in forward ends of said flanges, said extension means comprising a pair of parallel arms, pins on front ends of said arms projecting laterally on both sides of said arms to define pin ends, said pin ends being received in said grooves in the forward ends of said flanges, and means on said frame engaging with said extension means for locking said extension means to said frame after detachable connection of said extension means front end to said frame.

2. In a personal vehicle as claimed in claim 1 and further comprising a pin passing through holes in said side flanges near ends thereof directed toward the rear end of said frame over an arm seated in said channel mount to prevent pivoting of said arm.

3. In a personal vehicle as claimed in claim 1 wherein said mount blocks each have projecting means protruding above the surface thereof, said extension means comprising a pair of parallel arms and each of said arms contacting said surface of the mounting blocks when said arms are detachably connected to said mount blocks, said arms each have a recess therein to receive said projecting means such that said arms are restrained against longitudinal movement.

4. In a personal vehicle as claimed in claim 1 wherein said web is attached to said frame by bolts which project above a surface of the web between said flanges, said arms having recesses therein to receive said projecting bolts such that said arms are restrained against longitudinal movement when connected to said mount blocks.

5. In a personal vehicle, a frame having a rear end, a drive train assembly comprising a transaxle and drive wheels on the ends thereof and positionable rearwardly of said frame rear end to define an operative position, extension means comprising at least one flat leaf spring projecting forwardly from said drive train assembly and having a front end, at least one channel member on the underside of said frame having a front edge portion and there being a groove in said front edge portion opening away from the rear end of said frame, means on said front end of said extension means for defining a pin receiveable in said groove when said extension means front end is received within said channel member and said drive train assembly is disposed in its operative position, and means on said frame engaging said extension means when said drive train assembly is disposed in its operative position and said pin is received in said groove to restrain said extension means from pivotal and longitudinal movement.

6. In a personal vehicle as claimed in claim 5 wherein said extension means comprises a pair of parallel arms, said frame having a pair of longitudinal members each having one end and a transverse member connecting said one ends to define said rear end of said frame, said front ends of said arms of said extension means being detachably connected to said longitudinal members of said frame.

7. In a personal vehicle as claimed in claim 5 wherein said frame comprises a front frame section having a pair of spaced longitudinal frame members extending rearwardly and having rear ends, a rear frame section having a rear end, coacting first first and second means on said front and rear frame sections respectively for detachably connecting at least a portion of said rear frame section between said rear ends of said front frame section.

* * * * *